US006905201B2

(12) United States Patent
Leighton

(10) Patent No.: US 6,905,201 B2
(45) Date of Patent: Jun. 14, 2005

(54) SOLID PHASE CHANGE INK MELTER ASSEMBLY AND PHASE CHANGE INK IMAGE PRODUCING MACHINE HAVING SAME

(75) Inventor: Roger Leighton, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/320,819

(22) Filed: Dec. 16, 2002

(65) Prior Publication Data

US 2004/0114007 A1 Jun. 17, 2004

(51) Int. Cl.[7] .......................... B41J 2/175; G01D 11/00

(52) U.S. Cl. .............................. 347/88; 347/85; 347/99

(58) Field of Search .............................. 347/88, 85, 99; B41J 2/175; G01D 11/00

(56) References Cited

U.S. PATENT DOCUMENTS

| | | | | | |
|---|---|---|---|---|---|
| 3,958,208 | A | * | 5/1976 | Blaha | 338/22 R |
| 4,636,803 | A | | 1/1987 | Mikalsen | 346/1.1 |
| 4,739,339 | A | | 4/1988 | DeYoung et al. | 346/1.1 |
| 5,038,157 | A | | 8/1991 | Howard | 346/140 R |
| 5,239,163 | A | * | 8/1993 | Brouwers | 219/202 |
| 5,372,852 | A | | 12/1994 | Titterington et al. | 427/288 |
| 5,386,224 | A | * | 1/1995 | Deur et al. | 347/7 |
| 5,471,034 | A | * | 11/1995 | Kawate et al. | 219/485 |
| 5,690,080 | A | * | 11/1997 | Pelgrim et al. | 123/549 |
| 5,784,089 | A | * | 7/1998 | Crawford | 347/88 |
| 6,053,608 | A | | 4/2000 | Ishii et al. | 347/88 |
| D453,787 | S | | 2/2002 | Mattern | D18/56 |

FOREIGN PATENT DOCUMENTS

| | | | | | |
|---|---|---|---|---|---|
| EP | 464955 | A1 | * | 1/1992 | F24H/3/04 |
| JP | 01278362 | A | * | 11/1989 | B41J/3/04 |

* cited by examiner

*Primary Examiner*—Stephen D. Meier
*Assistant Examiner*—Leonard Liang
(74) *Attorney, Agent, or Firm*—Tallam I. Nguti

(57) ABSTRACT

A solid phase change ink melter assembly is provided in a phase change ink image producing machine. The solid phase change ink melter assembly includes (a) a melter housing having walls defining a melting chamber; and (b) a positive temperature coefficient (PTC) heating device mounted within the melting chamber for heating and melting solid pieces of phase change ink into melted molten liquid ink.

18 Claims, 4 Drawing Sheets

SOLID PHASE CHANGE INK MELTER ASSEMBLY AND PHASE CHANGE INK IMAGE PRODUCING MACHINE HAVING SAME

RELATED CASE

This application is related to U.S. application Ser. No. 10/320,854 entitled "HIGH SHEAR BALL CHECK VALVE DEVICE AND A LIQUID INK IMAGE PRODUCING MACHINE USING SAME"; and U.S. application Ser. No. 10/320,820 entitled "PHASE CHANGE INK MELTING AND CONTROL APPARATUS AND METHOD AND A PHASE CHANGE INK IMAGE PRODUCING MACHINE HAVING SAME"; and U.S. application Ser. No. 10/320,853 entitled "SOLID PHASE CHANGE INK PRE-MELTER ASSEMBLY AND A PHASE CHANGE INK IMAGE PRODUCING MACHINE HAVING SAME", each of which is being filed herewith on the same day and having at least one common inventor.

BACKGROUND OF THE INVENTION

This invention relates generally to image producing machines, and more particularly to a solid phase change ink melter assembly and a phase change ink image producing machine or printer having same.

In general, phase change ink image producing machines or printers employ phase change inks that are in the solid phase at ambient temperature, but exist in the molten or melted liquid phase (and can be ejected as drops or jets) at the elevated operating temperature of the machine or printer. At such an elevated operating temperature, droplets or jets of the molten or liquid phase change ink are ejected from a printhead device of the printer onto a printing media. Such ejection can be directly onto a final image receiving substrate, or indirectly onto an imaging member before transfer from it to the final image receiving media. In any case, when the ink droplets contact the surface of the printing media, they quickly solidify to create an image in the form of a predetermined pattern of solidified ink drops.

An example of such a phase change ink image producing machine or printer, and the process for producing images therewith onto image receiving sheets is disclosed in U.S. Pat. No. 5,372,852 issued Dec. 13, 1994 to Titterington et al. As disclosed therein, the phase change ink printing process includes raising the temperature of a solid form of the phase change ink so as to melt it and form a molten liquid phase change ink. It also includes applying droplets of the phase change ink in a liquid form onto an imaging surface in a pattern using a device such as an ink jet printhead. The process then includes solidifying the phase change ink droplets on the imaging surface, transferring them the image receiving substrate, and fixing the phase change ink to the substrate.

Conventionally, the solid form of the phase change is a "stick", "block", "bar" or "pellet" as disclosed for example in U.S. Pat. No. 4,636,803 (rectangular block 24, cylindrical block); U.S. Pat. No. 4,739,339 (cylindrical block); U.S. Pat. No. 5,038,157 (hexagonal bar); U.S. Pat. No. 6,053,608 (tapered lock with a stepped configuration). Further examples of such solid forms are also disclosed in design patents such as U.S. Pat. No. D453,787 issued Feb. 19, 2002. In use, each such block form "stick", "block", "bar" or "pellet" is fed into a heated melting device that melts or phase changes the "stick", "block", "bar" or "pellet" directly into a print head reservoir for printing as described above.

Conventionally, phase change ink image producing machines or printers, particularly color image producing such machines or printers, are considered to be low throughput, typically producing at a rate of less than 30 prints per minute (PPM). The throughput rate (PPM) of each phase change ink image producing machine or printer employing solid phase change inks in such "stick", "block", "bar" or "pellet" forms is directly dependent on how quickly such a "stick", "block", "bar" or "pellet" form can be melted down into a liquid. The quality of the images produced depends on such a melting rate, and on the types and functions of other subsystems employed to treat and control the phase change ink as solid and liquid, the imaging member and its surface, the printheads, and the image receiving substrates.

There is therefore a need for a relatively high-speed (greater than "XX" PPM) phase change ink image producing machine or printer that is also capable of producing relatively high quality images, particularly color images on plain paper substrates.

SUMMARY OF THE INVENTION

In accordance with the present invention, there is provided a solid phase change ink melter assembly is provided in a phase change ink image producing machine. The solid phase change ink melter assembly includes (a) a melter housing having walls defining a melting chamber; and (b) a positive temperature coefficient (PTC) heating device mounted within the melting chamber for heating and melting solid pieces of phase change ink into melted molten liquid ink

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
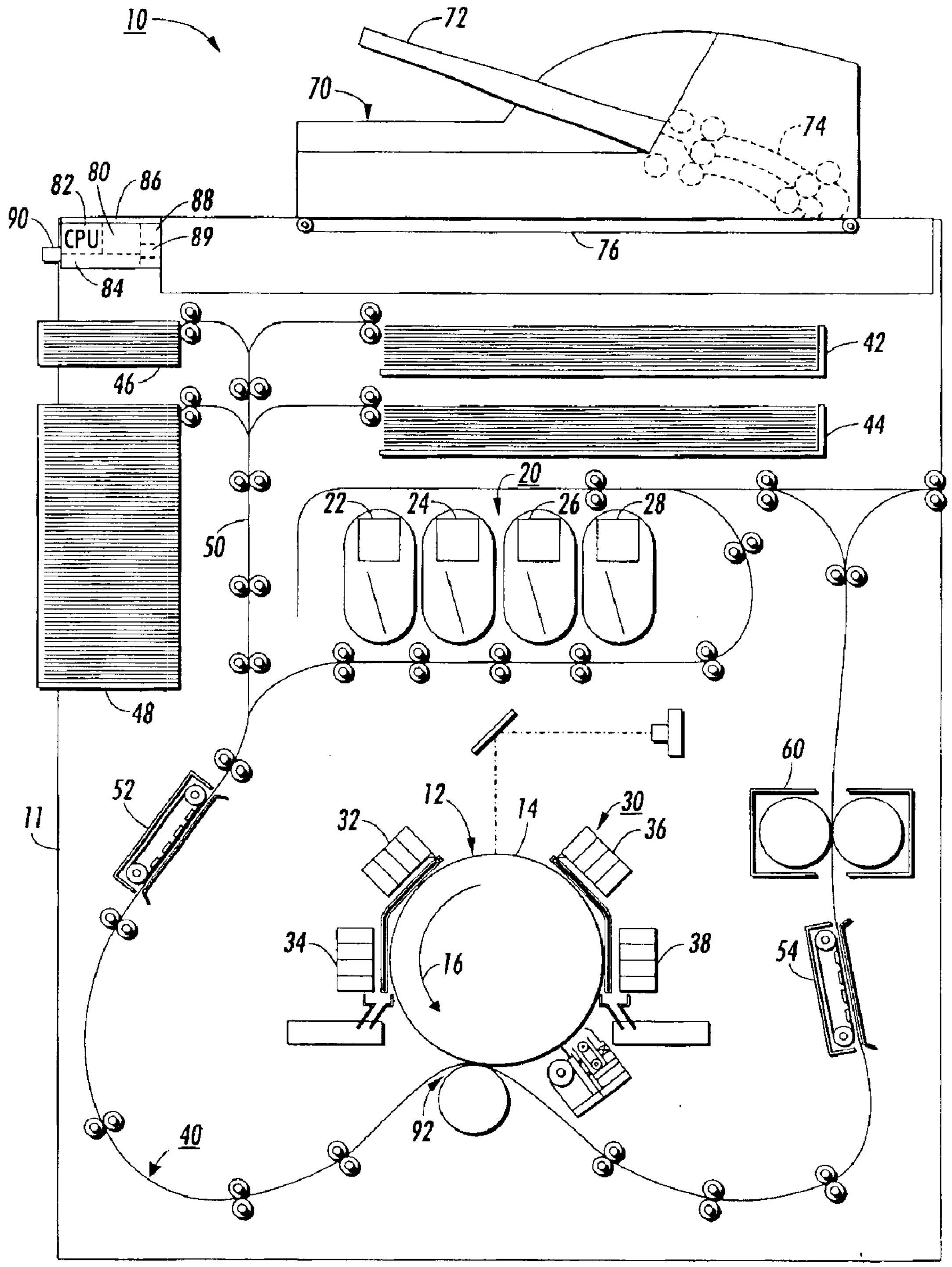
FIG. 1 is a vertical schematic of the high-speed phase change ink image producing machine or printer including the solid phase change ink melter assembly of the present invention.

Referring now to FIG. 1, there is illustrated an image producing machine, such as the high-speed phase change ink image producing machine or printer 10 of the present invention. As illustrated, the machine 10 includes a frame 11 to which are mounted directly or indirectly all its operating subsystems and components, as will be described below. To start, the high-speed phase change ink image producing machine or printer 10 includes an imaging member 12 that is shown in the form of a drum, but can equally be in the form of a supported endless belt. The imaging member 12 has an imaging surface 14 that is movable in the direction 16, and on which phase change ink images are formed.

The high-speed phase change ink image producing machine or printer 10 also includes a phase change ink delivery subsystem 20 that has at least one source 22 of one color phase change ink in solid form. Since the phase change ink image producing machine or printer 10 is a multicolor image producing machine, the ink delivery system 20 includes four (4) sources 22, 24, 26, 28, representing four (4) different colors CYMK (cyan, yellow, magenta, black) of phase change inks. The phase change ink delivery system also includes the melting and control apparatus (FIG. 2) for melting or phase changing the solid form of the phase change ink into a liquid form, and then supplying the liquid form to a printhead system 30 including at least one printhead assembly 32. Since the phase change ink image producing machine or printer 10 is a high-speed, or high throughput, multicolor image producing machine, the printhead system includes four (4) separate printhead assemblies 32, 34, 36 and 38 as shown.

As further shown, the phase change ink image producing machine or printer 10 includes a substrate supply and handling system 40. The substrate supply and handling system 40 for example may include substrate supply sources 42, 44, 46, 48, of which supply source 48 for example is a high capacity paper supply or feeder for storing and supplying image receiving substrates in the form of cut sheets for example. The substrate supply and handling system 40 in any case includes a substrate handling and treatment system 50 that has a substrate pre-heater 52, substrate and image heater 54, and a fusing device 60. The phase change ink image producing machine or printer 10 as shown may also include an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 84, and a display or user interface (Ul) 86. The ESS or controller 80 for example includes sensor input and control means 88 as well as a pixel placement and control means 89. In addition the CPU 82 reads, captures, prepares and manages the image data flow between image input sources such as the scanning system 76, or an online or a work station connection 90, and the printhead assemblies 32, 34, 36, 38. As such, the ESS or controller 80 is the main multi-tasking processor for operating and controlling all of the other machine subsystems and functions, including the machine's printing operations.

In operation, image data for an image to be produced is sent to the controller 80 from either the scanning system 76 or via the online or work station connection 90 for processing and output to the printhead assemblies 32, 34, 36, 38. Additionally, the controller determines and/or accepts related subsystem and component controls, for example from operator inputs via the user interface 86, and accordingly executes such controls. As a result, appropriate color solid forms of phase change ink are melted and delivered to the printhead assemblies. Additionally, pixel placement control is exercised relative to the imaging surface 14 thus forming desired images per such image data, and receiving substrates are supplied by anyone of the sources 42, 44, 46, 48 and handled by means 50 in timed registration with image formation on the surface 14. Finally, the image is transferred within the transfer nip 92, from the surface 14 onto the receiving substrate for subsequent fusing at fusing device 60.

Referring now to FIGS. 1–4, the melter assembly 300 of the present invention is further illustrated in greater detail. As shown, each color ink CYMK (represented by the letters A, B, C, D) has a melter assembly 300, and description of one will suffice as a description of each of the others. Each melter assembly 300 includes a housing 302 that has walls 304 defining a melting chamber 306. Each melter assembly 300 also includes a positive temperature coefficient (PTC) heating device 310 that is mounted within the melting chamber 306 for heating and melting solid pieces of phase change ink to turn them into melted molten liquid ink. Each melter housing 302 also includes an electrically insulative member 312 between the PTC heating device 310 and a base 308 of the melter housing. Each housing 302 further includes a screen device 314 that is mounted below the PTC heating device 310 as shown for removing unwanted particles from the melted molten liquid ink coming from the heating device 310.

The PTC heating device 310 is comprised of a device frame 316 made of a conductive material such as aluminum, a pill portion 320, and a folded fin 322, 324 that is also made of a conductive material such as aluminum. The folded fin 322, 324 acts as a heating element for providing the heat and melting surface area that contact and melt the solid pieces phase change ink. As shown, the PTC heating device includes a pair 322, 324 of the folded fins, with one mounted to each side of the pill portion 320. The pill portion 320 is formed and set for self-regulating or controlling the PTC heating device 310 at a control temperature Tc of about 170° C. which is calculated to be significantly higher than a melting temperature Tm (110° C.) of the solid phase change ink. The pill portion 320 is made for example of strontium titanate, and is of the open loop type, meaning that its performance is affected by the material temperature Tw of the solid pieces of phase change ink being heated.

In general, PTC heaters function as self-regulating heating elements. They can operate at a nearly constant temperature over a broad range of voltage and current dissipation conditions. PTC heaters as such can be manufactured in many different shapes such as discs, rectangles, squares, cylinders, and various other shapes, and each shape can include holes or passages for increasing heating surface area.

Figure 3:
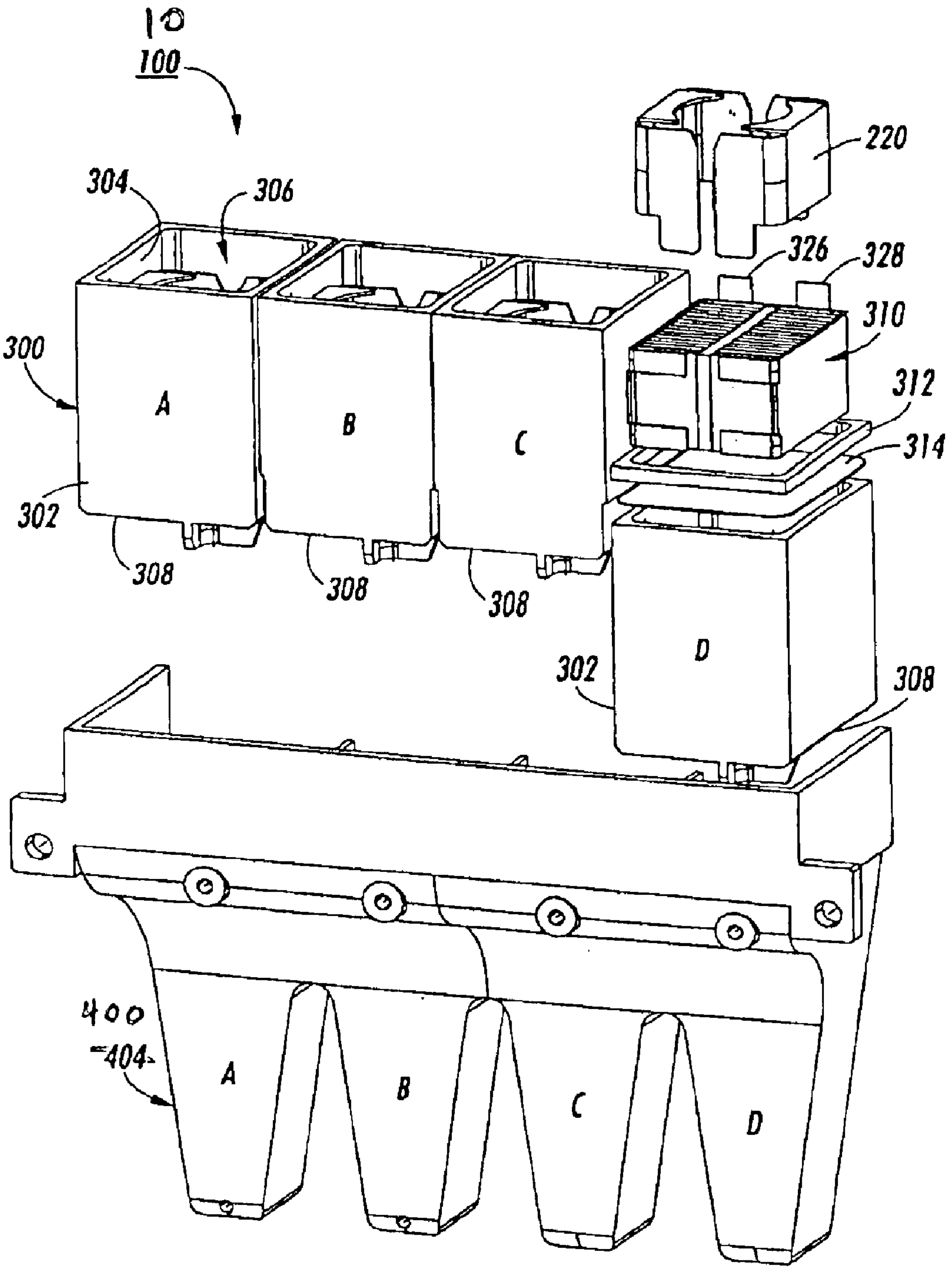
FIG. 3 is a perspective, partially exploded view of the solid phase change ink melter assembly FIG. 2.
Figure 4:
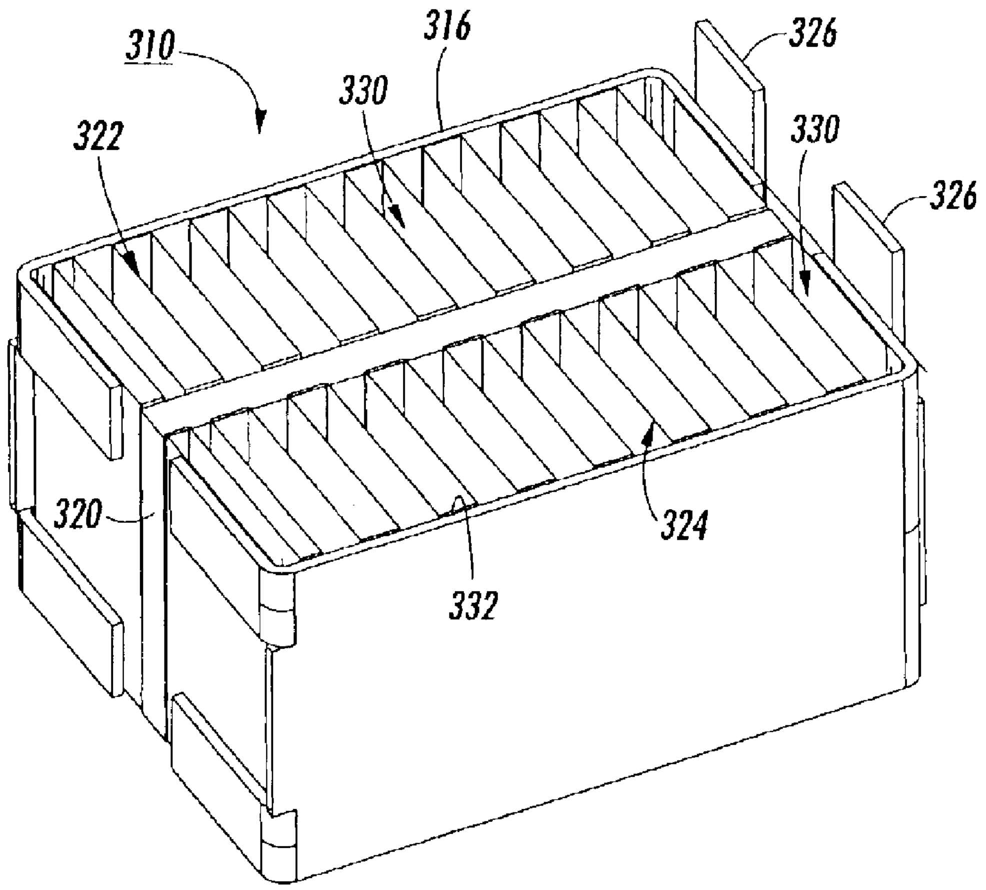
FIG. 4 is a perspective illustration of the PTC heater of the solid phase change ink melter assembly in accordance with the present invention.

As shown in FIGS. 3–4, the PTC heating device 310 of the present invention includes a pair of electrodes 326, 328 that are connected to the folded fins 322, 324. In addition, each folded fin 322, 324 defines through-passages or channels 330, which are located between each pair of fin folds 332 for example. The folded aluminum fins 322, 324 are not coated so as to allow for maximum heat transfer, and function to keep the solid pieces of ink separated during melting. This prevents coalescing of such pieces, which ordinarily would lump together and tend to clog the PTC heating device, as well as tend to increase the actual melting times. The folded fins 322, 324 also serve to increase the melting surface area, thus making the PTC heating device 310 more efficient.

The PTC heating device 310 is self-regulating because it can switch from a low resistance to a very high resistance as its temperature Ti and the temperature Tw of the solid pieces of phase change ink reach a prescribed limit. Switching off the current flow to the heating elements or folded fins 322, 324 effectively allows them to then cool. However, the temperature of the folded fins 322, 324, will remain at the control temperature Tc as long as current is being supplied to them, but the steady state current will remain at a reduced level in a no load (that is, no solid ink) condition.

However, when more and new solid pieces of phase change ink at a cooler temperature Tw are added onto the folded fins 322, 324 causing their temperature Ti to again drop below the control temperature Tc, current flow to the folded fins 322, 324 again resumes. In this application it is advantageous to keep solid pieces of phase change ink being melted at a material temperature Tw of about 160° C. The pill portion designed/compounded temperature of about 170° C. is therefore slightly higher than the expected material temperature of 160° C. The temperature of the folded fins 322, 324 however will drop to the heat of fusion temperature of the ink, which is about 110° C. during the melt process. The PTC heating device 310 consumes maximum power only when melting is occurring, after which power consumption drops to about 15% of the maximum power.

Each melter housing 302 is electrically insulative and thus serves to isolate the PTC heating device 310 from electrically shorting out on the aluminum frame 316 of the heating device 310. The PTC heating device 310 of the present invention for example uses 70 volts for raising the temperature Ti of the folded fins 322, 324 to 170° C. This is sufficient for heating and melting solid pieces of phase change ink that make direct or indirect contact with the folded fins 322, 324.

The PTC temperature Ti rise time to the 170° C. is desirably less than 5 seconds and therefore results in immediate melting of the solid pieces of phase change ink making contact therewith. The material temperature Tw of the solid pieces of phase change ink first rises to the ink's heat of fusion at 110° C. where it remains while the solid pieces melt to form a molten liquid ink.

Figure 2:
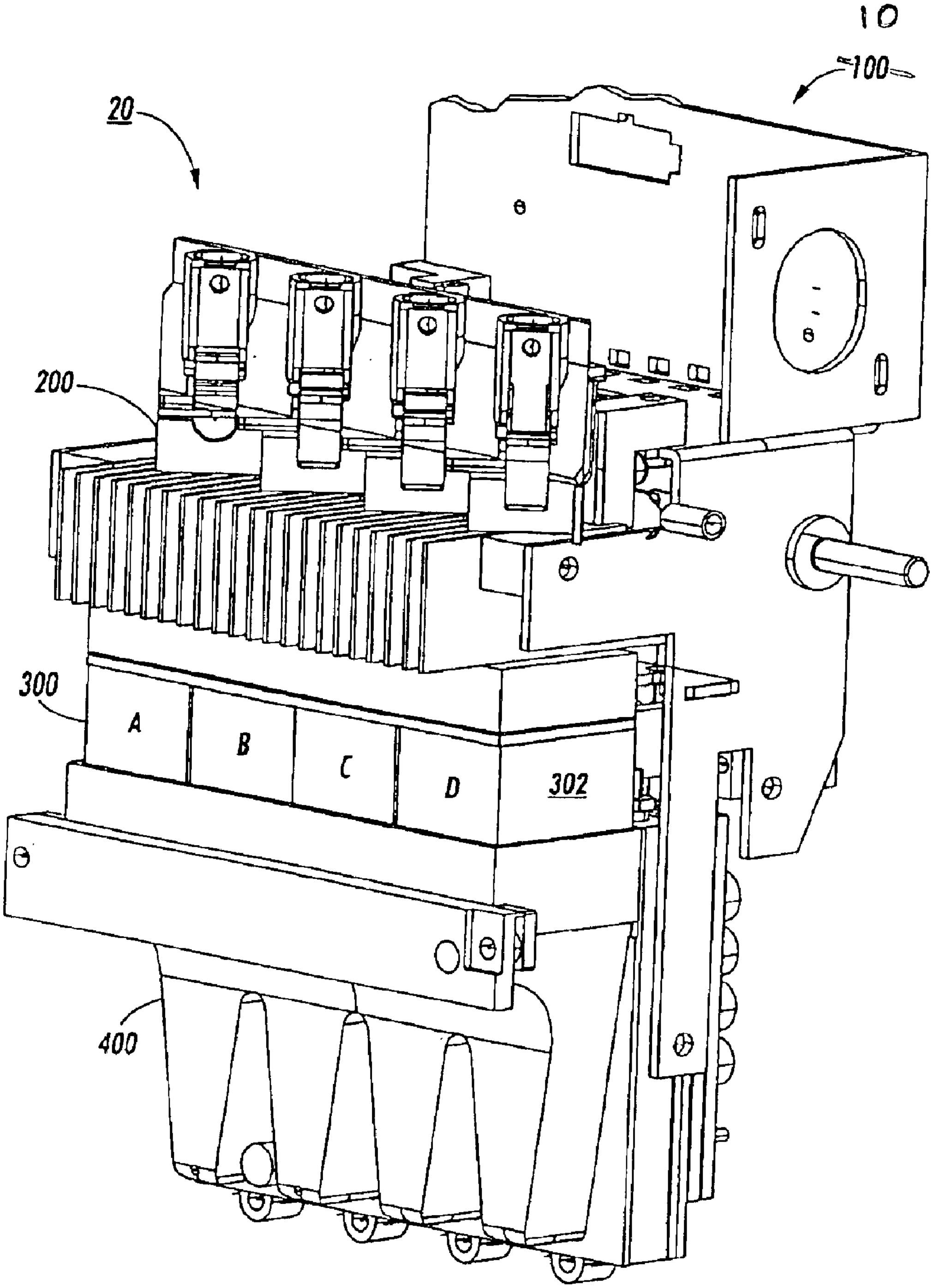
FIG. 2 is a partially exploded perspective view of the melting and control system including the solid phase change ink melter assembly of the present invention.

The molten liquid ink then drops gravitationally from the folded fins 322, 324 and through the passages or channels 330 to the molten liquid ink storage and control assembly 400 located below the melter assembly 300 (FIG. 2). Since the molten ink drop is gravitational, the residence time against the folded—fins 322, 324 is relatively low or short.

The melter assembly 300 also includes a heat retaining frame 220 for melting away solid ink pieces from the wall 302 in order to prevent ink build up on the inside walls of the melter housing. Such a build up ordinarily will interfere with solid ink pieces reaching the heating device 310. The pieces are melted by making contact with the heat retaining frame 220 which is made for example of aluminum, and is located peripherally within the melter housing 302. The heat retaining frame 220 is heated by the heat conduction through the fins making contact, and by convection losses of the melter assembly 300 and operates to keep melting solid pieces of ink away from the inside walls of the melter housing 302. Periodically when solid ink pieces have been fed to through the pre-melter assembly 200 to the melter assembly 300, the heating device (not shown) of the melter assembly will be turned on and kept on until the solid ink pieces are sufficiently melted. This ensures that the feed pipes 206A, 206B, 206C, 206D leading to the melter assembly 300 do not clog, and that melted ink does not coalesce on the inside walls of melter housing 302.

As can be seen, there has been provided a solid phase change ink melter assembly is provided in a phase change ink image producing machine. The solid phase change ink melter assembly includes (a) a melter housing having walls defining a melting chamber; and (b) a positive temperature coefficient (PTC) heating device mounted within the melting chamber for heating and melting solid pieces of phase change ink into melted molten liquid ink While the embodiment of the present invention disclosed herein is preferred, it will be appreciated from this teaching that various alternative, modifications, variations or improvements therein may be made by those skilled in the art, which are intended to be encompassed by the following claims:

What is claimed is:

1. A solid phase change ink melter assembly in a phase change ink image producing machine, the solid phase change ink melter assembly comprising:

(a) a melter housing having walls defining a melting chamber;

(b) a positive temperature coefficient (PTC) heating device mourned within said melting chamber for heating and melting solid pieces of phase change ink into melted molten liquid ink; and (c) a heat retaining frame mounted peripherally within said melter housing between said PTC heating device and inside walls of said melter housing for keeping solid pieces of phase change ink away from said inside walls of said melter housing, and for preventing melted ink from coalescing against said inside walls of said melter housing.

2. The solid phase change ink melter assembly of claim 1, including an electrically insulative member between said PTC heating device and a base of said melter housing.

3. The solid phase change ink melter assembly of claim 1, including a screen device mounted below said PTC heating device for removing unwanted particles from the melted molten liquid ink.

4. The solid phase change ink melter assembly of claim 1, wherein said PTC heating device includes a device frame, a pill portion, and a folded fin heating element for providing the heat and melting surface area for contacting and melting said solid pieces phase change ink.

5. The solid phase change ink melter assembly of claim 4, wherein said pill portion is made of strontium titanate.

6. The solid phase change ink melter assembly of claim 5, wherein a melting temperature for said solid pieces at phase change ink is 110° C. and said control temperature is 170° C.

7. The solid phase change ink melter assembly of claim 4, including a pair of said folded fin heating elements one mounted to each side of said pill portion.

8. The solid phase change ink melter assembly of claim 4, wherein said device frame is made of aluminum.

9. The solid phase change ink melter assembly of claim 4, wherein said folded fin heating element is made of aluminum.

10. A phase change ink image producing machine comprising:

(a) a control subsystem for controlling operation of all subsystems and components of the image producing machine;

(b) a movable imaging member having an imaging surface;

(c) a printhead system connected to said control subsystem for ejecting drops of melted molten liquid phase change ink onto said imaging surface to form an image;

(d) ink supply sources for supplying solid pieces of phase change ink to be heated and melted; and (e) a melter assembly for heating and melting said solid pieces of phase change ink into melted molten liquid ink, the melter assembly including:

(i) a melter housing having walls defining a melting chamber;

(ii) a positive temperature coefficient (PTC) heating device mounted within said melting chamber for heating and melting solid pieces of phase change ink into melted molten liquid ink; and (iii) a heat retaining frame mounted peripherally within said melter housing between said PTC heating device and inside walls of said melter housing for keeping solid pieces of phase change ink away from said inside walls of said melter housing, and for preventing melted ink from coalescing against said inside walls of said melter housing.

11. The solid phase change ink melter assembly of claim 10, including a screen device mounted below said PTC heating device for removing unwanted particles from the melted molten liquid ink.

12. The solid phase change ink melter assembly of claim 10, including an electrically insulative member between said PTC heating device and a base of said melter housing.

13. The solid phase change ink melter assembly of claim 10, wherein said PTC heating device includes a device frame, a pill portion, and a folded fin heating element for providing the heat arid melting surface area for contacting arid melting said solid pieces phase change ink.

14. The solid phase change ink melter assembly of claim 13, wherein said pill portion is made of strontium titanate.

15. The solid phase change ink melter assembly of claim 14, wherein a melting temperature for said solid pieces of phase change ink is 110° C. and said control temperature is 170° C.

16. The solid phase change ink melter assembly of claim 13, including a pair of said folded fin heating elements one mounted to each side of said pill portion.

17. The solid phase change ink melter assembly of claim 13, wherein said device frame is made of aluminum.

18. The solid phase change ink melter assembly of claim 13, wherein said folded fin heating element is made of aluminum.

* * * * *